US012238471B2

(12) United States Patent
Zalisk et al.

(10) Patent No.: US 12,238,471 B2

(45) Date of Patent: *Feb. 25, 2025

(54) IN-EAR EARPIECE RETAINING STRUCTURE

(71) Applicant: BOSE CORPORATION, Framingham, MA (US)

(72) Inventors: Michael Andrew Zalisk, Arlington, MA (US); Liam Robert Kelly, Dorchester, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,312

(22) Filed: Sep. 14, 2023

(65) Prior Publication Data

US 2024/0007778 A1 Jan. 4, 2024

Related U.S. Application Data

(63) Continuation of application No. 17/679,583, filed on Feb. 24, 2022, now Pat. No. 11,800,273, which is a (Continued)

(51) Int. Cl.

*H04R 1/10* (2006.01)

*H04R 1/02* (2006.01)

(52) U.S. Cl.

CPC ............. *H04R 1/1016* (2013.01); *H04R 1/02* (2013.01); *H04R 1/105* (2013.01); *H04R 1/1083* (2013.01); *H04R 1/1091* (2013.01)

(58) Field of Classification Search

CPC ........ H04R 1/10; H04R 1/1016; H04R 1/105; H04R 1/1066; H04R 25/02; H04R 25/652;

(Continued)

(56) References Cited

U.S. PATENT DOCUMENTS 3,935,401 A * 1/1976 Shore ................... H04R 1/1016 181/135

4,055,233 A * 10/1977 Huntress .............. H04R 1/1016 181/135

(Continued)

FOREIGN PATENT DOCUMENTS

| | | |
|---|---|---|
| GB | 267611 A | 3/1927 |
| JP | 2010530659 A | 9/2010 |

(Continued)

OTHER PUBLICATIONS

First Korean Office Action dated Nov. 30, 2023 for Korean Patent Application No. 10-2022-7043223.

(Continued)

*Primary Examiner* — Ryan Robinson

(57) ABSTRACT

Aspects describe a dual-planar retaining piece for stabilizing and securing earpiece in a wearer's ear. The retaining piece is either fixed or removable from the earpiece. The retaining piece includes a first cantilevered portion shaped to flexibly fit under the antitragus of a wearer's ear when the earpiece is worn, a second cantilevered portion shaped to flexibly fit under the antihelix of the wearer's ear when the earpiece is worn, and at least one attachment feature that couples the retaining piece to a body of the earpiece, wherein the body is shaped to fit in the lower concha of the wearer's ear when the earpiece is worn. In aspects, the first and second cantilevered portions are integrally formed.

18 Claims, 6 Drawing Sheets

Related U.S. Application Data continuation of application No. 16/883,529, filed on May 26, 2020, now Pat. No. 11,297,408.

(58) Field of Classification Search
CPC ............ H04R 25/656; H04R 2225/025; H04R 2225/77
See application file for complete search history.

(56) References Cited

U.S. PATENT DOCUMENTS

| | | | | |
|---|---|---|---|---|
| 5,712,453 A * | 1/1998 | Bungardt | H04R 1/1066 | 181/135 |
| 8,374,375 B2 * | 2/2013 | Hu | H04R 1/1016 | 381/328 |
| 8,406,447 B2 * | 3/2013 | Kromann | H04R 1/1016 | 381/328 |
| 8,897,480 B2 * | 11/2014 | Tan | H04R 1/1016 | 381/370 |
| 9,264,792 B2 * | 2/2016 | Mainini | H04R 1/1058 | |
| 9,462,366 B2 * | 10/2016 | Silvestri | H04R 1/1083 | |
| 10,433,045 B2 * | 10/2019 | Trainer | H04R 1/105 | |
| 10,587,947 B2 * | 3/2020 | Kelley | H04R 1/105 | |
| 10,728,645 B2 * | 7/2020 | Briggs | H04R 1/105 | |
| 10,820,085 B1 * | 10/2020 | Sandanger | H04R 1/105 | |
| 10,972,823 B2 * | 4/2021 | Chou | H04R 1/1041 | |
| 11,122,353 B2 * | 9/2021 | Sandanger | H04R 1/105 | |
| 11,503,396 B2 * | 11/2022 | Sandanger | H04R 1/1016 | |
| 2019/0253782 A1 | 8/2019 | Monahan | | |
| 2023/0111906 A1 * | 4/2023 | Takano | H04R 1/1016 | 381/74 |

FOREIGN PATENT DOCUMENTS

| | | | | |
|---|---|---|---|---|
| JP | 2014524219 A | 9/2014 | | |
| JP | 2018522497 A | 8/2018 | | |
| WO | WO-2019058523 A1 * | 3/2019 | | H04R 1/10 |

OTHER PUBLICATIONS

First Office Action dated Feb. 5, 2024 for Japanese Patent Application No. 2022-572770.

* cited by examiner

IN-EAR EARPIECE RETAINING STRUCTURE

CROSS-REFERENCE TO RELATED APPLICATIONS

This application is a continuation of U.S. patent application Ser. No. 17/679,583, filed on Feb. 24, 2022, which is a continuation of U.S. patent application Ser. No. 16/883,529, filed on May 26, 2020, now U.S. Pat. No. 11,297,408. The contents of U.S. patent application Ser. Nos. 17/679,583 and 16/883,529 are incorporated herein by reference in their entirety.

FIELD

Aspects of the present disclosure describe various features of a retaining structure for an earpiece of an in-ear audio output device. As described in more detail herein, the retaining structure includes a “scoop” or “flap” that operates as a spring element to both to create stability and push the earpiece towards the ear canal.

BACKGROUND

People wear audio output devices for long periods of time and while they engage in various types of activity. As an example, people wear in-ear earpieces throughout the day as they commute, work, and exercise. The functionality provided by in-ear earpieces continues to improve due advancements in technology and the ability of the earpieces to communicate with the Internet and smart devices. As such, in-ear earpieces are becoming more integral in people’s daily lives. Given use and popularity of in-ear earpieces, it is desirable for earpieces to comfortably stay in the user’s ear.

SUMMARY

Aspects provide a retaining structure for an in-ear earpiece. In an aspect, a retaining piece for an earpiece of an in-ear audio output device comprises a first cantilevered portion shaped to flexibly sit under the antitragus of a wearer’s ear when the earpiece is worn, a second cantilevered portion shaped to flexibly fit under the antihelix of the wearer’s ear when the earpiece is worn, and at least one attachment feature that couples the retaining piece to a body of the earpiece, wherein the body is shaped to fit in the lower concha of the wearer’s ear when the earpiece is worn.

In aspects, the attachment feature spans part of an outer perimeter of the body. The first cantilevered portion comprises a first side and a second side substantially opposite the first side, the first side of the first cantilevered portion coupled to the attachment feature, and the second cantilevered portion comprises a first side and a second side substantially opposite the first side, the first side of the second cantilevered portion coupled to the attachment feature.

In aspects, the second side of the first cantilevered portion folds towards first side of the first cantilevered portion when the attachment feature is coupled to the body of the earpiece positioned in the wearer’s ear, and the second side of the second cantilevered portion folds towards the first side of the second cantilevered portion when the attachment feature is coupled to the body of the earpiece and positioned in the wearer’s ear.

In aspects, the first side of the first cantilevered portion is primarily on a first plane and the first side of the second cantilevered portion is primarily on a second plane different than the first plane. In aspects, the first plane is located deeper, towards the ear canal of the wearer as compared to the second plane when the earpiece is worn.

In aspects, one of the first cantilevered portion or the second cantilevered portion comprises fringes. In aspects, the first cantilevered portion and the second cantilevered portion are integrally formed. In aspects, the first cantilevered portion and the second cantilevered portion have different durometers. In aspects, the attachment feature is shaped to span an outer perimeter of the body.

Aspects provide an earpiece of an in-ear audio output device, comprising: a body shaped to fit in the lower concha of a wearer’s ear when the earpiece is worn, a retaining piece comprising a first cantilevered portion shaped to flexibly fit under the antitragus of a wearer’s ear, a second cantilevered portion shaped to flexibly fit under the antihelix of the wearer’s ear, and at least one attachment feature that couples the retaining piece to the body.

In aspects, the attachment feature spans part of an outer perimeter of the body, the first cantilevered portion comprises a first side and a second side substantially opposite the first side, the first side of the first cantilevered portion coupled to the attachment feature, and the second cantilevered portion comprises a first side and a second side substantially opposite the first side, the first side of the second cantilevered portion coupled to the attachment feature.

In aspects, the second side of the first cantilevered portion folds towards first side of the first cantilevered portion when the earpiece is positioned in the wearer’s ear, and the second side of the second cantilevered portion folds towards the first side of the second cantilevered portion when the earpiece is positioned in the wearer’s ear.

In aspects, the first side of the first cantilevered portion is primarily on a first plane and the first side of the second cantilevered portion is primarily on a second plane different than the first plane.

In aspects, the first plane is located deeper towards the ear canal of the wearer as compared to the second plane when the earpiece is worn.

In aspects, the first cantilevered portion or the second cantilevered portion comprises fringes. In aspects, the first cantilevered portion and the second cantilevered portion have different durometers. In aspects, the first cantilevered portion and the second cantilevered portion are integrally formed. In aspects, the attachment feature is shaped to span an outer perimeter of the body.

In aspects, the earpieces further comprises a nozzle extending towards the ear canal of the wearer’s ear and comprising a planar, distal end, the nozzle comprising an acoustic passage to conduct sound waves to the ear canal of the wearer, a substantially spherical dome-shaped sealing structure extending from the planar, distal end of the nozzle. In aspects, the end of the nozzle comprises a substantially elliptical opening for the acoustic passage.

In aspects, the major axis of the substantially elliptical opening is substantially aligned with a major axis of the wearer’s ear canal when the earpiece is positioned in the wearer’s ear. In aspects the sealing structure comprises a narrow end coupled to the nozzle and a wider end that is larger than a typical ear canal is wide. In aspects, the retaining piece is removable from the body.

All examples and features mentioned herein can be combined in any technically possible manner. Other features, objects, and advantages will become apparent from the following detailed description, when read in connection with the following drawing.

DETAILED DESCRIPTION

Some earpieces, such as the StayHear+ ear tips, sit securely inside a wearer's ear with no need to push them into place. Earpieces with this design use the antihelix of the wearer's ear for added support. These designs are comfortable, create a gentle seal to facilitate noise reduction, spread contact evenly across the wearer's ear to avoid pressure points, and help provide consistent audio performance while maximizing noise reduction; however, newer designs attempt to increase the amount of electronics placed around the wearer's concha.

The retaining piece described herein provides orientation and stability without excessive radial pressure. Orientation helps ensure the earpiece is properly in the wearer's ear. Achieving stability refers to the earpiece staying in the wearer's ear with minimal movement when properly inserted. The described retaining piece helps the in-ear earpiece house more electronics in a region around the wearer's concha and sit comfortably in the wearer's ear for long periods of time while the wearer engages in various activities.

The retaining piece includes a first cantilevered portion shaped to flexibly fit under the antitragus of a wearer's ear when the earpiece is worn and a second cantilevered portion shaped to flexibly fit under the antihelix of the wearer's ear when the earpiece is worn. In aspects, the first and second cantilevered portions are integrally formed. The retaining piece also includes an attachment feature that couples or otherwise attaches the retaining piece to a body of the earpiece. The illustrated retaining piece and earpiece are shown for a wearer's right ear. A retaining piece and earpiece that is designed to fit in the wearer's left ear is a mirror image of the retaining piece and earpiece described below, and operates according to the same principles.

Figure 1A:
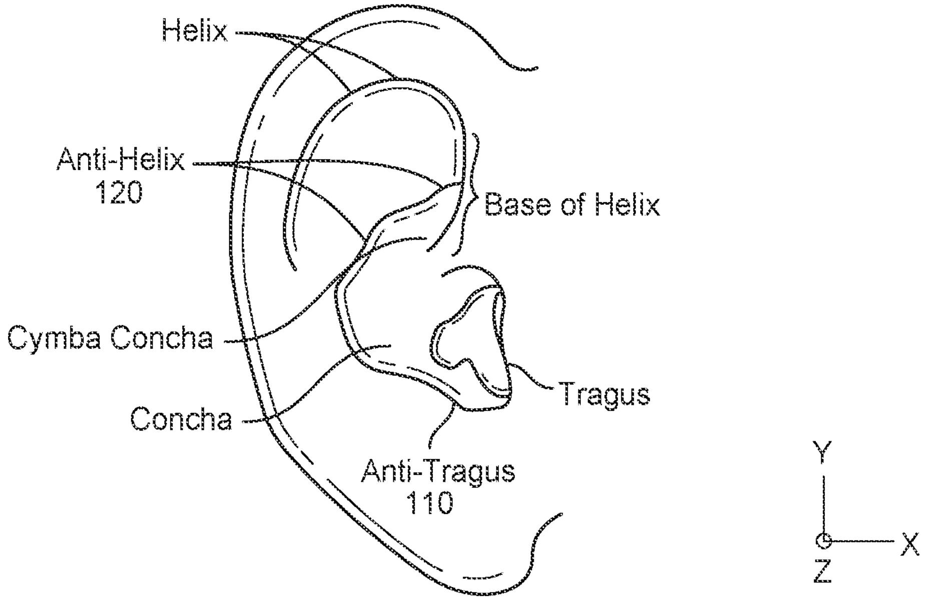
FIG. 1A is a view of the lateral surface of the human ear.

FIG. 1A shows the lateral surface of a human right ear, with some features identified. There are many different ear sizes and geometries. Some ears have additional features that are not shown in FIG. 1A. Some ears lack some of the features that are shown in FIG. 1A. Some features may be more or less prominent than are shown in FIG. 1A.

The retaining piece described herein includes a cantilevered feature which may be referred to as a scoop or flap. The cantilevered feature includes at least a first cantilevered portion and a second cantilevered portion based on typical ear geometry. The first cantilevered portion fits under the antitragus of a wearer's ear in the region 110 when the earpiece is worn. The second cantilevered portion fits under the antihelix of the wearer's ear in the region 120 when the earpiece is worn. In aspects, second cantilevered portion fits under a small, lower portion of the antihelix of the wearer's ear. In aspects, the cantilevered portions are integrally formed. The cantilevered portion applies pressure to the ear along the antitragus and, at least, a small lower portion of the antihelix. As a result, the retaining piece creates stability and pushes the earpiece towards the wearer's ear canal. Additionally, the retaining piece supports an earpiece body that houses electronics along the bowl of the wearer's concha.

Figure 1B:
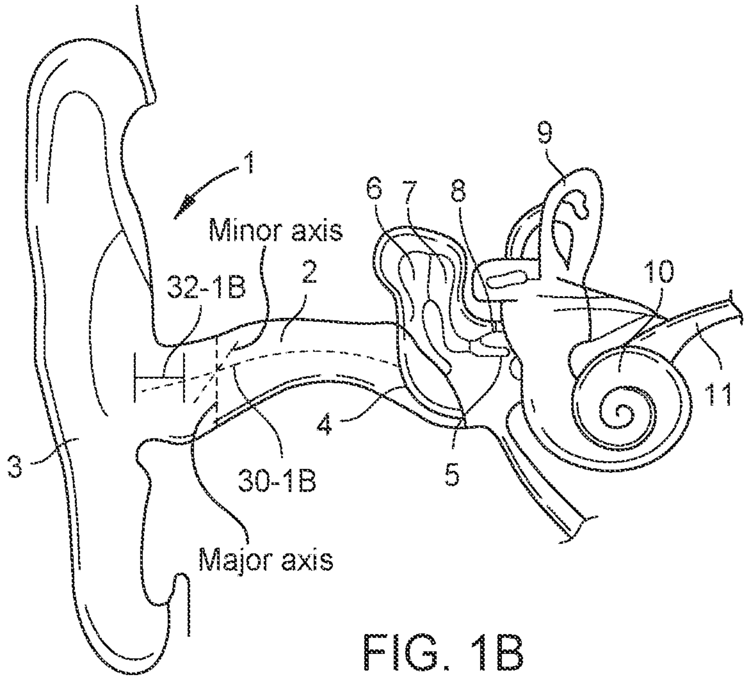
FIGS. 1B and 1C are exemplary cross-sections of the human ear.
Figure 1C:
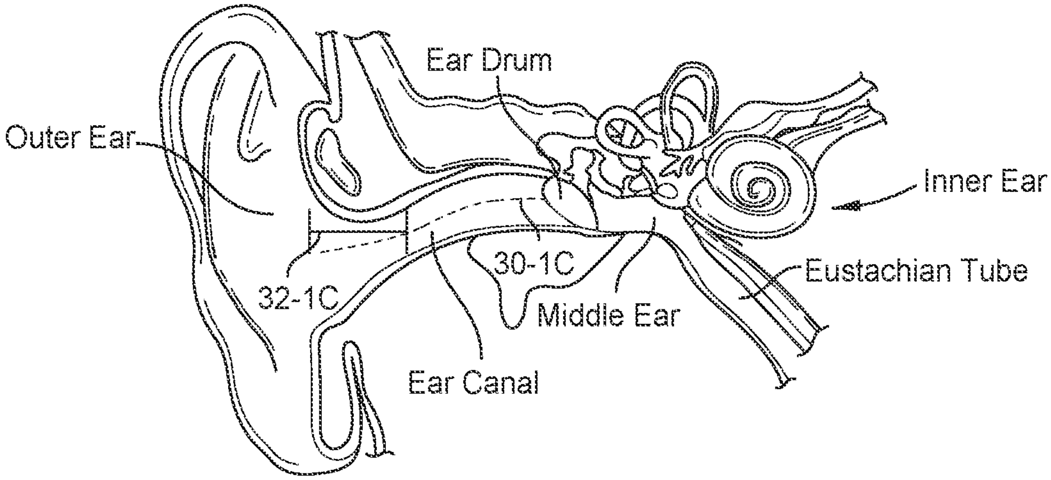

FIGS. 1B and 1C show two exemplary cross-sections of the human ear, with some features identified. The ear canal is an irregularly shaped cylinder with a variable cross sectional area and a centerline that is not straight. Among the features identified is the entrance to the ear canal and the main portion of the ear canal. In this specification, the entrance to the ear canal refers to the portion of the ear canal near the concha where the walls of the ear canal are substantially non-parallel to the centerline of the ear canal. The precise structure of the human ear varies widely from individual to individual. For example, in the cross section of FIG. 1B, there is a relatively sharp transition from ear canal walls that are non-parallel to a centerline 30-1B of the ear canal to walls that are substantially parallel to a centerline of the ear canal, so the entrance 32-1B to the ear canal is relatively short. In the cross-section of FIG. 1C, there is a more gradual transition from walls that are non-parallel to a centerline of the ear canal to walls that are substantially parallel to a centerline 30-1C of the ear canal, so the entrance 32-1C to the ear canal is relatively long.

Figure 2:
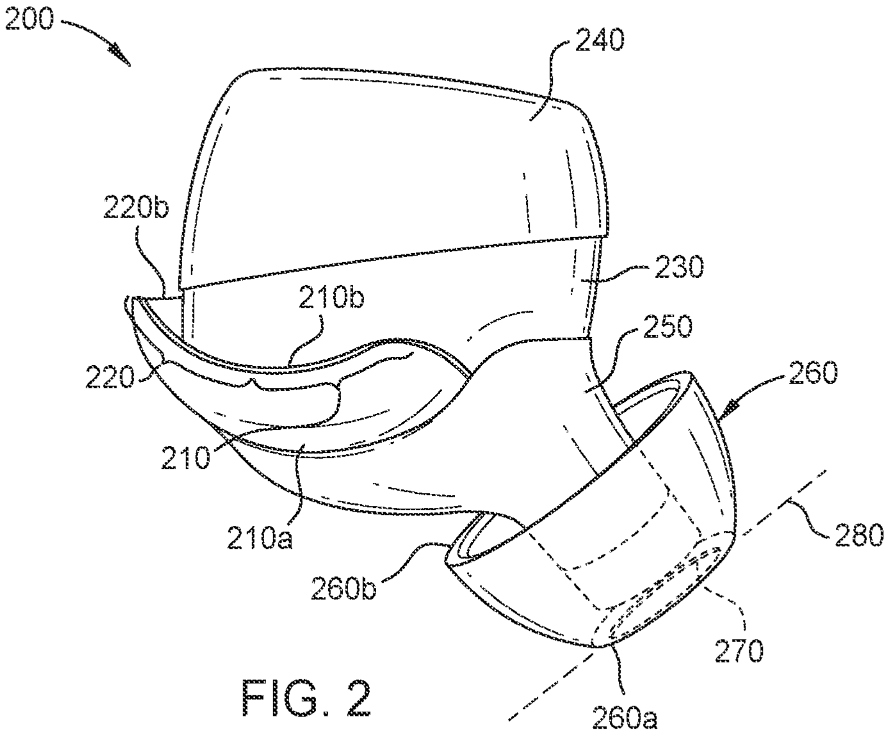
FIG. 2 is a side-view of an in-ear earpiece including a retaining piece, attachment feature, body, nozzle, and sealing structure, according to aspects of the present disclosure.
Figure 3:
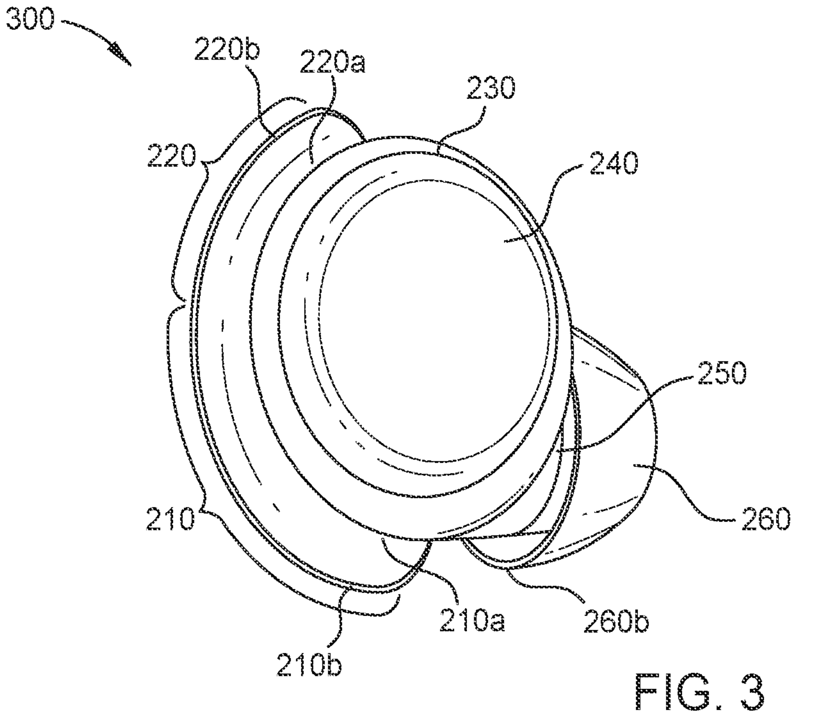
FIG. 3 is a front view of the in-ear earpiece including the retaining piece, attachment feature, body, nozzle, and sealing structure, according to aspects of the present disclosure.
Figure 4:
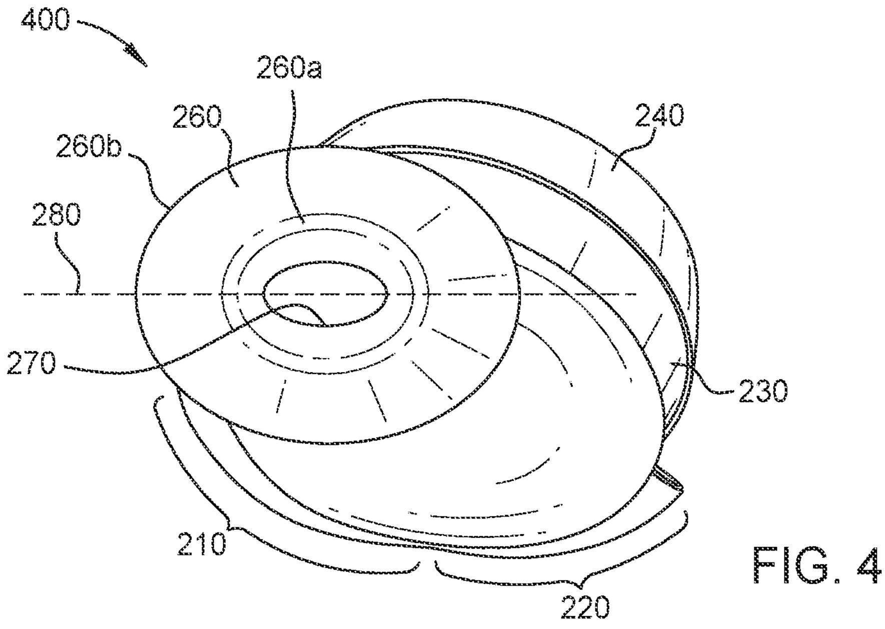
FIG. 4 is a front view of the nozzle attached to the in-ear earpiece including the retaining attachment feature, body, and sealing structure, according to aspects of the present disclosure.

FIG. 2 is a side-view of an in-ear earpiece 200 including a retaining piece, FIG. 3 is a front view 300 of the in-ear earpiece and retaining piece, and FIG. 4 is a front view 400 of the nozzle 260 of the in-ear earpiece including the retaining piece, according to aspects of the present disclosure.

The retaining piece includes a first cantilevered portion 210 that flexibly fits under the antitragus, a second cantilevered portion 220 that flexibly fits under the antihelix, and an attachment feature 230. In aspects, the first cantilevered portion 210 and the second cantilevered portion 220 are integrally formed. Each of the first and second cantilevered portions include a first side that is proximate to the attachment feature 230 and the body 240 and a second, free-side that is more distant to the attachment feature 230 and the body 240, at least, when the earpiece is not inserted in a wearer's ear.

As will be described in more detail with reference to FIGS. 6 and 7, The first and second cantilevered portions have a scoop or curved shape, so that the retaining piece comfortably conforms to the shape of the wearer's antitragus region 110 and antihelix region 120, respectively, when the earpiece is inserted in the wearer's ear. The curved shape allows the second free-side of each of the cantilevered portions to gently roll up towards the attachment feature 230 and the body 240 when the first and second cantilevered portions contact the antitragus and antihelix, respectively. In this manner, the retaining piece secures an earpiece for a wide range of ear geometries and sizes. If a wearer has a large ear, less of the free-side of the cantilevered portions may roll up towards the body 240 when the earpiece is inserted in the ear. If a user has a smaller ear, more of the free-side of the cantilevered portions may roll up towards the body 240 when the free-side contacts the antitragus and antihelix. In both cases, however, the same retaining piece comfortably provides stability to keep the earpiece in place and properly oriented, and offers slight resistance when the wearer removes the earpiece by pulling the body 240 away from the ear canal.

The first cantilevered portion 210 includes a first side 210*a* that is coupled to the attachment feature 230 and a second side 210*b* that folds towards the first side 210*a* when the earpiece 200 is inserted in a wearer's ear. The second cantilevered portion 220 includes a first side 220*a* (shown in, for example, FIG. 3 and FIGS. 6-9) and a second side 220*b* that folds towards the first side 220*a* when the earpiece 200 is inserted in the wearer's ear. The first side 210*a* of the first cantilevered portion 210 is coupled to the attachment feature 230. The first side 220*a* of the second cantilevered portion 220 is also coupled to the attachment feature 230. In aspects, the first side 210*a* of first cantilevered portion 210 and the first side 220*a* of the second cantilevered portion 220 are attached to the attachment feature 230. In aspects, the first cantilevered portion 210, the second cantilevered portion 220, and the attachment feature 230 are integrally formed.

The attachment feature 230 attaches the retaining piece to the earpiece 200. In aspects, and as shown in the FIGs., the attachment feature 230 is shaped to span an outer perimeter of the body 240 of the earpiece 200. In aspects, the attachment feature 230 allows the retaining piece to be removed from the earpiece 200. The FIGS. illustrate the attachment feature 230 as a sleeve that fits around the outer perimeter of the body 240; however, in aspects the attachment feature is any feature that couples the first cantilevered portion 210 and the second cantilevered portion 220 to the body 240 of the earpiece 200. The attachment feature does not have to span an outer perimeter of the body 240. As an example, the attachment feature may snap or slide into a portion of an outer perimeter of the body to connect the first cantilevered portion 210 and the second cantilevered portion 220 to the body 240.

The earpiece 200 includes a body 240, nozzle 250, and sealing structure 260. The body 240 is shaped to fit in and around the lower concha of the wearer and houses the acoustic driver and other electronics for the earpiece 200. In aspects, the retaining piece is removably attached to the body 240. In other aspects, any combination of the first cantilevered portion 210, the second cantilevered portion 220, and the attachment feature 230 are attached to the body or integrally formed with the body. In an example, when the first and second cantilevered portions 210, 220 are directly attached to the body 240, the retaining piece does not include the attachment feature 230.

Figure 5:
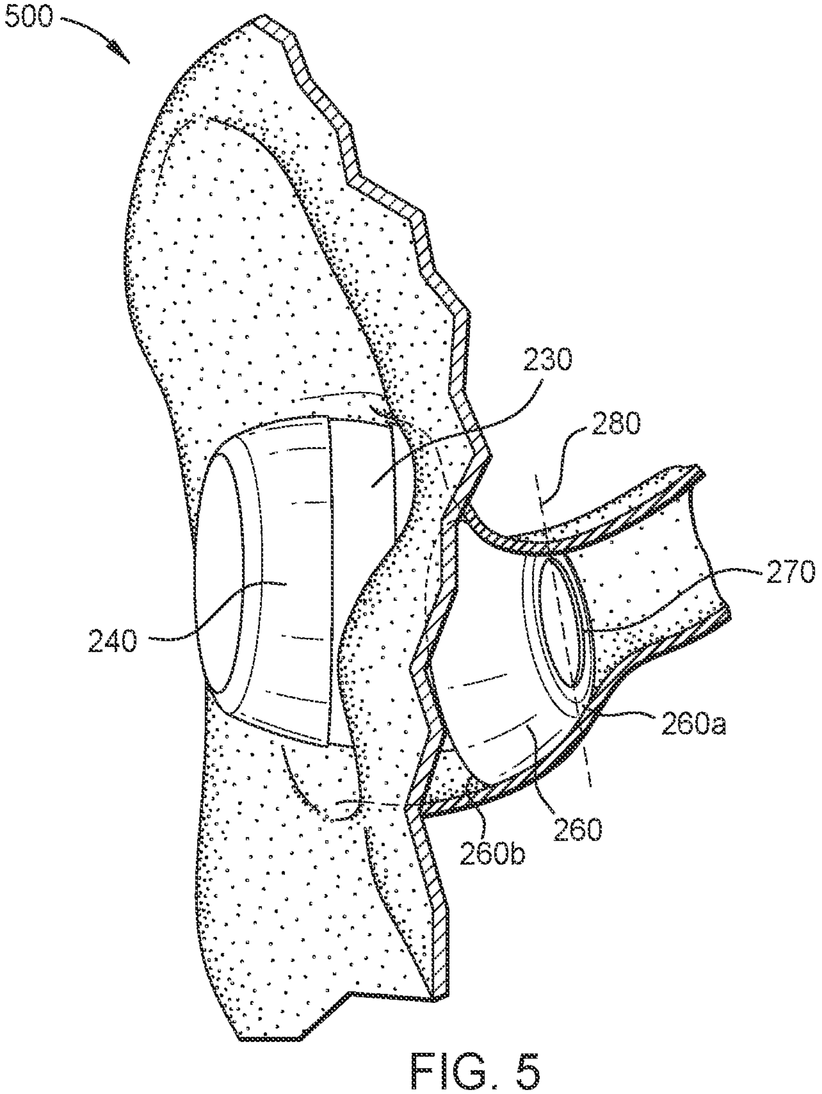
FIG. 5 is a side perspective view of the earpiece positioned in a wearer's ear, according to aspects of the present disclosure.

The nozzle 250 extends from the body 240 towards the sealing structure 260. The nozzle 250 includes an acoustic passage for sound waves to pass to the ear canal of the wearer. In FIGS. 2, 4, and 5, the nozzle 250 has a planar end with a substantially elliptical-shaped opening 270. The major axis 280 of the substantially elliptical-shaped opening 270 is substantially aligned with a major axis of the wearer's ear canal (see FIGS. 1B and 5) when the earpiece is positioned in the wearer's ear. In other words, the major axis 280 of the substantially elliptical-shaped opening 270 is aligned with the length of the wearer's head. In FIGS. 2-5, the nozzle comprises a substantially elliptical opening for the acoustic passage; however, in other aspects, the opening is oval shaped or racetrack shaped.

The sealing structure 260 creates a seal with a typical wearer's ear canal. The sealing structure 260 is substantially spherically-dome shaped. The sealing structure extends from the planar end of the nozzle 250 and folds back towards the wearer's outer ear. As shown in FIGS. 2, 4 and 5, the sealing structure 260 includes a narrow end 260*a* coupled to the nozzle 250 and a wider end 260*b* that is larger than a typical ear canal is wide. There is a soft, round connection between the narrow end 260*a* of the sealing structure and the wider end 260*b* of the sealing structure. In an example, the connection between the narrow end 260*a* and the wider end 260*b* is described as pillow-shaped, dome-shaped, soft, and/or slightly curved. This type of connection places less pressure on the wearer's ear canal and decreases the force vector that pushes the earpiece 200 out of the wearer's ear canal.

FIG. 5 illustrates a side perspective view 500 of the earpiece positioned in a wearer's ear. As described above, instead of a straight connection, the sealing structure 260 has a slightly curved (pillow-shaped, dome-shaped, and/or soft) connection between the narrow end 260*a* of the sealing structure and the wider end 260*b* of the sealing structure. Further, the elliptical opening 270 aligns with typical ear geometry and allows a same earpiece to comfortably accommodate varying ear sizes.

Figure 6:
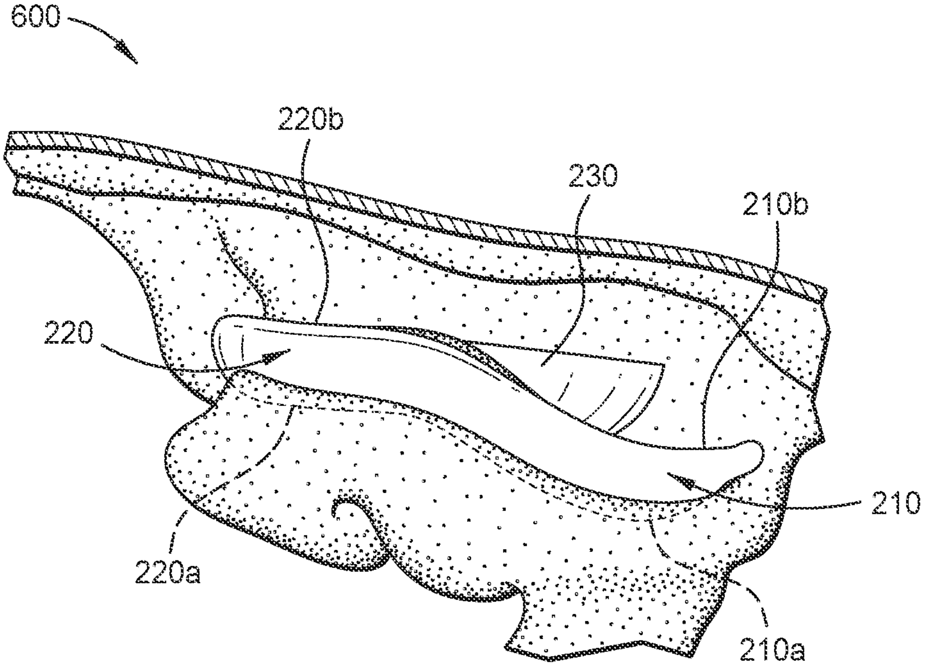
FIG. 6 is a side perspective view of the retaining piece positioned in a wearer's ear, according to aspects of the present disclosure.
Figure 7:
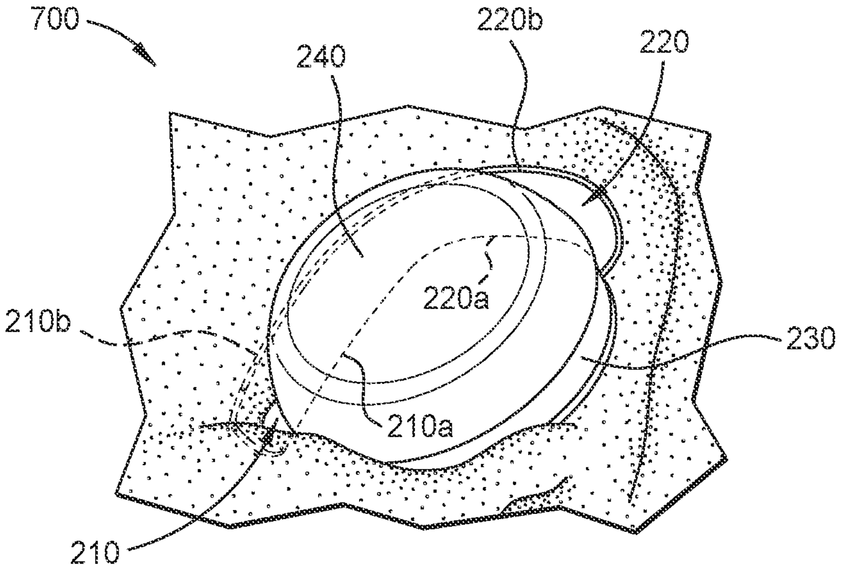
FIG. 7 is a top perspective view of the earpiece positioned in the wearer's ear, according to aspects of the present disclosure.

FIG. 6 illustrates a side perspective view 600 of the retaining piece positioned in a wearer's ear and FIG. 7 illustrates a top perspective view 700 of the earpiece positioned in the wearer's ear, according to aspects of the present disclosure.

The curved design of the first cantilevered portion 210 and the second cantilevered portion 220 are illustrated. When the first cantilevered portion 210 contacts the wearer's antitragus, the second, free-side 210*b* gently rolls up toward the attachment feature 230. Similarly, when the second cantilevered portion 220 contacts the wearer's antihelix, the second-free side 220*b* gently rolls up towards the attachment feature 230.

In aspects, due to typical ear geometries, the first cantilevered portion 210 and the second cantilevered portion 220 are primarily on different planes. As shown in FIG. 6, the first cantilevered portion 210 sits deeper in the ear canal when the earpiece is worn as compared the second cantilevered portion. In aspects, the first side 210*a* of the first cantilevered portion 210 is primarily on a first plane that is closer to the ear canal as compared to the first side 220*a* of the second cantilevered portion 220 when the earpiece is worn.

In FIG. 7, a small portion of the first cantilevered portion 210 and a small portion of the second cantilevered portion 220 are visible from a top view when the earpiece is inserted in the wearer's ear. A top part of the second cantilevered portion contacts the wearer's antihelix causing the second side 220*b* to curve up towards the attachment feature 230 and the body 240. The outer ear blocks view of the remainder of the first and second cantilevered portions; however, they are both shown using dashed lines to illustrate a top view of the retaining piece positioned in the wearer's ear canal at a deeper cross-section of the wearer's ear.

Figure 8:
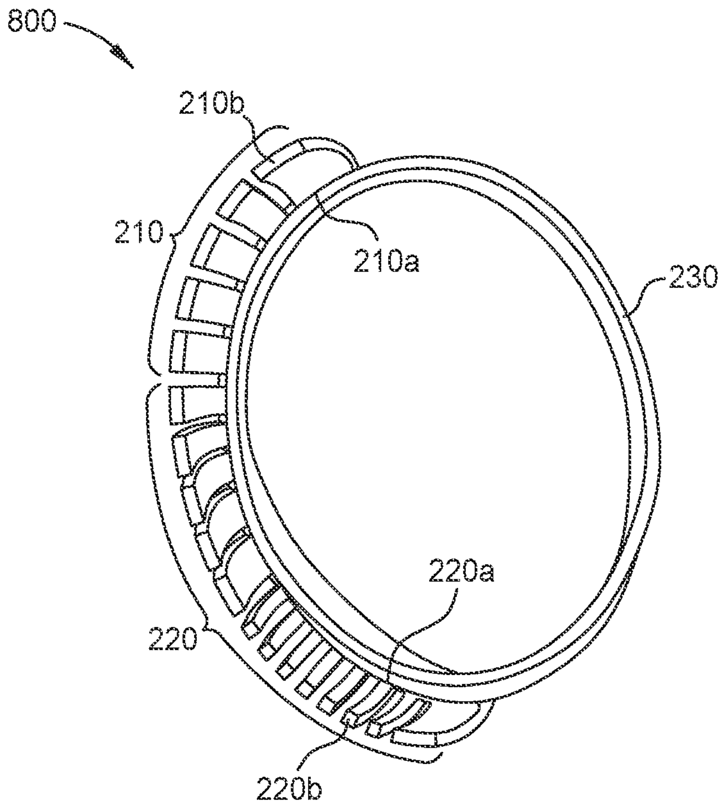
FIG. 8 is a front view of an example retaining piece including fringes on the second, free-side of both the first cantilevered portion and the second cantilevered portion, according to aspects of the present disclosure.
Figure 9:
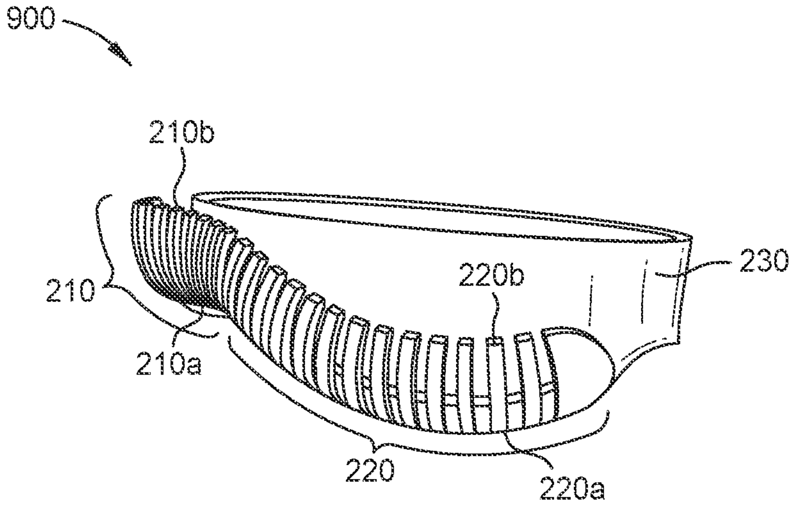
FIG. 9 is a side view of the retaining piece including fringes on the second, free-side of both the first cantilevered portion and the second cantilevered portion, according to aspects of the present disclosure.

FIG. 8 illustrates a front view 800 of an example retaining piece including fringes on the first cantilevered portion 210 and the second cantilevered portion 220 and FIG. 9 is a side view 900 of the retaining piece including fringes, according to aspects of the present disclosure.

As described above, the first and second cantilevered portions provide flexibility for a variety of ear sizes and geometries. In aspects, the retaining pieces include other features for increased flexibility and/or comfort. As an example, one or more of the outer perimeter of the free, second sides 210*b* and 220*b* are not contiguous and instead include fringes (or fingers). The width of each finger need not be substantially the same. In one example, thinner fingers are used in areas where more flexibility is desired, such as in the region 110. In regions of the ear where there is a rapid change (e.g., curvature) in ear geometry or more variation from person to person, fringes provide flexibility for a single retaining piece to fit most ears. In FIG. 8, the lower portion of the first cantilevered portion has thinner fringes as compared to other parts of the first and second cantilevered portions. While not illustrated, in aspects, only part of the first or second cantilevered portions includes fringes.

In aspects, the retaining piece is made of any biocompatible material and has a varying thickness. In an example, a higher durometer material is used where less flexibility is desired. In regions where greater flexibility is desired, for example, due to varying ear geometry between people or a curved area of the ear, a lower durometer material may be used for increased flexibility.

In non-illustrated aspects, the first cantilevered portion 210 decreases in thickness from the first side 210*a* towards the second, free-side 210*b*. Similarly, in aspects, the second cantilevered portion 220 becomes thinner towards the second free-side 220*b*.

The dual-planar retaining piece has high compliance in the direction of the bud toward the ear canal and offers some stiffness in the vertical direction when the wearer attempts to rotate or remove the earpiece.

The earpiece described herein is applicable to a variety of devices, including audio headphones, hearing aids, hearing assistance headphones, noise-masking earbuds, ANR headphones, aviation headphones, and other devices that include an in-ear component.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A retaining piece for an earpiece of an in-ear audio output device comprising:
- a first scoop; and
- an attachment feature that couples the first scoop to a body of the earpiece,
- wherein a first side of the first scoop is coupled to the attachment feature, and
- wherein a second side of the first scoop, substantially opposite the first side of the first scoop, is configured to roll towards the attachment feature when the first scoop contacts an antitragus of a wearer as the earpiece is inserted into an ear of the wearer.

2. The retaining piece of claim 1, wherein the first scoop includes a concave surface that faces away from a concha of the wearer when the earpiece is worn, and an opposing, convex surface that faces towards the concha when the earpiece is worn.

3. The retaining piece of claim 1, further comprising a second scoop, wherein a first side of the second scoop is coupled to the attachment feature, and
- wherein a second side of the second scoop, substantially opposite the first side of the second scoop, is configured to roll towards the attachment feature when the second scoop contacts an antihelix of the wearer as the earpiece is inserted into the ear of the wearer.

4. The retaining piece of claim 3, wherein the second scoop includes a concave surface that faces away from a concha of the wearer when the earpiece is worn, and an opposing, convex surface that faces towards the concha when the earpiece is worn.

5. The retaining piece of claim 3, wherein a first side of the first scoop is primarily on a first plane, and a first side of the second scoop is primarily on a second plane different than the first plane.

6. The retaining piece of claim 3, wherein the first scoop and the second scoop are integrally formed.

7. The retaining piece of claim 3, wherein the first scoop, the second scoop, and the attachment feature are integrally formed.

8. The retaining piece of claim 1, further comprising a second scoop, wherein the second scoop includes a concave surface that faces away from a concha of the wearer when the earpiece is worn, and an opposing, convex surface that faces towards the concha when the earpiece is worn.

9. The retaining piece of claim 1, wherein the attachment feature is in the form of a sleeve that is configured to span an outer perimeter of the body of the earpiece.

10. A retaining piece for an earpiece of an in-ear audio output device comprising:
- a first scoop; and
- an attachment feature that couples the first scoop to a body of the earpiece,
- wherein a first side of the first scoop is coupled to the attachment feature, and
- wherein a second side of the first scoop, substantially opposite the first side of the first scoop, is configured to roll towards the attachment feature when the first scoop contacts an antihelix of a wearer as the earpiece is inserted into an ear of the wearer.

11. The retaining piece of claim 10, wherein the first scoop includes a concave surface that faces away from a concha of the wearer when the earpiece is worn, and an opposing, convex surface that faces towards the concha when the earpiece is worn.

12. The retaining piece of claim 10, further comprising a second scoop, wherein the second scoop includes a concave surface that faces away from a concha of the wearer when the earpiece is worn, and an opposing, convex surface that faces towards the concha when the earpiece is worn.

13. The retaining piece of claim 12, wherein the second scoop comprises a first side of the second scoop and a second side of the second scoop substantially opposite the first side of the second scoop, wherein the first side of the second scoop is coupled to the attachment feature, and wherein the first side of the first scoop is primarily on a first plane, and the first side of the second scoop is primarily on a second plane different than the first plane.

14. The retaining piece of claim 13, wherein the second scoop is shaped to flexibly fit under an antitragus of the ear of the wearer when the earpiece is worn.

15. The retaining piece of claim 13, further comprising a second scoop, wherein a first side of the second scoop is coupled to the attachment feature, and wherein a second side of the second scoop, substantially opposite the first side of the second scoop, is configured to roll towards the attachment feature when the second scoop contacts an antitragus of the wearer as the earpiece is inserted into the ear of the wearer.

16. The retaining piece of claim 12, wherein the first scoop and the second scoop are integrally formed.

17. The retaining piece of claim 12, wherein the first scoop, the second scoop, and the attachment feature are integrally formed.

18. The retaining piece of claim 10, wherein the attachment feature is in the form of a sleeve that is configured to span an outer perimeter of the body of the earpiece.

* * * * *